United States Patent

Nagaishi et al.

[11] Patent Number: 5,884,605
[45] Date of Patent: Mar. 23, 1999

[54] CONTROLLER AND CONTROL METHOD FOR ENGINE IGNITION TIMING

[75] Inventors: Hatsuo Nagaishi, Yokohama; Yoshiaki Yoshioka, Sagamihara; Kazushige Yokota, Zama, all of Japan

[73] Assignee: Nissan Motor Co., Ltd., Kanagawa, Japan

[21] Appl. No.: 926,489

[22] Filed: Sep. 10, 1997

[30] Foreign Application Priority Data

Sep. 10, 1996 [JP] Japan ..................................... 8-238784

[51] Int. Cl.⁶ ................................ F02P 5/04; F02D 45/00
[52] U.S. Cl. ................................ 123/339.11; 123/406.24; 123/406.29; 123/406.41; 123/406.52; 123/406.59
[58] Field of Search .......................... 123/339.11, 406.23, 123/406.24, 406.25, 406.29, 406.41, 406.5, 406.51, 406.52, 406.59, 406.64; 701/102; 477/102

[56] References Cited

U.S. PATENT DOCUMENTS

| | | | |
|---|---|---|---|
| 4,825,832 | 5/1989 | Satoh et al. | 123/406.21 |
| 5,662,084 | 9/1997 | Deguchi et al. | 123/339.11 |
| 5,740,045 | 4/1998 | Livshiz et al. | 123/352 X |
| 5,752,485 | 5/1998 | Minowa et al. | 123/399 |

FOREIGN PATENT DOCUMENTS 63-280862  11/1988  Japan .

*Primary Examiner*—Tony M. Argenbright
*Attorney, Agent, or Firm*—McDermott, Will & Emery

[57] ABSTRACT

A target torque is calculated as a proportion PI relative to a torque generated by an engine at a basic ignition timing. An ignition timing correction amount is calculated based on this proportion PI, and by correcting the ignition timing by this correction amount, an ignition timing correction which precisely matches a torque-down request is performed rapidly and accurately.

21 Claims, 11 Drawing Sheets

CONTROLLER AND CONTROL METHOD FOR ENGINE IGNITION TIMING

FIELD OF THE INVENTION

This invention relates to control of a shaft torque by modifying an engine ignition timing.

BACKGROUND OF THE INVENTION

Tokkai Sho 63-280862 published by the Japanese Patent Office in 1988, for example, discloses control of a basic ignition timing of an engine which realizes minimum spark advance for best torque (MBT) in order to improve engine fuel-cost performance.

However, the MBT is not used in all operating regions of the engine, and in some of these regions, the basic ignition timing is retarded relative to the MBT. For example, in the low speed, high load region of the engine, the basic ignition timing is set to a value later than the MBT so as to prevent knocking. Also even when an idle switch is ON, the basic ignition timing is set later than the MBT in order to improve engine running stability under no load conditions.

When the basic ignition timing is set to a value later than the MBT, torque can be increased by advance correction of the ignition timing even when there is a drop in engine speed when the idle switch is ON. In other words, due to the advance correction of the ignition timing, the ignition timing approaches the MBT and torque increases. As a result of this torque increase, the engine rotation speed returns to a set idle rotation speed. The basic ignition timing is also set to a value later than the MBT so as to prevent increase in the discharge amount of hydrocarbons (HC).

Various torque-down controls are also practiced in order to stabilize idle running, to prevent speed change shocks, or to reduce the shock due to a sudden acceleration or transient surge backing immediately thereafter.

Describing speed change shocks, a step occurs in the torque transmitted to the drive wheels when there is a shift-up of a transmission. The magnitude of the speed change shock due to this step depends on driving conditions such as engine rotation speed or throttle valve opening at that time. The torque step is also larger the higher the speed or the greater the throttle opening.

To eliminate this torque step, the following control is for example performed.

When there is a shift-up such as during acceleration, a torque-down request signal is sent from an automatic transmission control unit to an engine control unit via a communications device. In response to the torque-down request signal, the engine control unit applies a retardation correction to the ignition timing according to a throttle valve opening and the engine speed, so that a torque-down due to this retardation correction cancels out a torque-up due to the shift-up.

However, the offset amount from the MBT of the basic ignition timing and the generated torque are not in a first order linear relation, and it is not easy to precisely correct the ignition timing so as to accurately satisfy any given torque-down request.

Moreover the torque-down amount when a given ignition timing correction is applied depends on the magnitude of the offset amount from the MBT of the basic ignition timing. For example, the ignition timing correction amount required to obtain the same torque-down is different when the basic ignition timing is equal to the MBT and when it is not.

For these reasons, it was not easy to apply an ignition timing correction amount to a torque-down amount.

SUMMARY OF THE INVENTION

It is therefore an object of this invention to facilitate application of an ignition timing correction amount to a required torque-down amount.

It is a further object of this invention to increase the precision of a torque correction by ignition timing control.

In order to achieve the above objects, this invention provides an ignition controller for an engine, comprising a spark plug and a control circuit therefor.

The control circuit is functioning to set a basic ignition timing of the spark plug, calculate a target torque as a proportion PI relative to a torque generated by the engine at the basic ignition timing, calculate an ignition timing correction amount based on the proportion PI, calculate a corrected ignition timing by applying the ignition timing correction amount to the basic ignition timing, and fire the spark plug in synchronism with the corrected ignition timing.

It is preferable that the control circuit calculates the ignition timing correction amount by the process of calculating an offset amount MBTZURE of the basic ignition timing from a minimum spark advance for best torque, calculating a base torque based on the offset amount MBTZURE, calculating a corrected torque by multiplying the base torque by the proportion PI, calculating an offset amount TDM from the minimum spark advance for best torque corresponding to the corrected torque, and setting a difference between the offset amount MBTZURE and the offset amount TDM as the ignition timing correction amount.

The base torque is for example represented by an indicated torque of the engine found from an engine indicator diagram. It is preferably calculated as a proportion relative to a maximum base torque.

The basic ignition timing is preferably retarded relative to the minimum spark advance for best torque.

It is also preferable that the control circuit is further functioning to calculate the minimum spark advance for best torque by the process of: (a) dividing a total gas weight in a cylinder of the engine by a basic value of unburnt gas density in the cylinder and a basic value of stratified flow flame velocity in the cylinder; (b) adding a predetermined firing retardation time of the spark plug to the value obtained in process (a); and (c) converting the value obtained in process (b) to the minimum spark advance for best torque.

It is further preferable that the control circuit sets the basic ignition timing by offset correcting the minimum spark advance for best torque based on a trimming map.

The trimming map preferably specifies a retardation amount to prevent knocking of the engine.

It is also preferable that the trimming map specifies a retardation amount to prevent surge of the engine.

It is also preferable that the trimming map specifies a retardation amount to control a combustion pressure increase rate of the engine.

It is also preferable that the trimming map specifies a retardation amount to mitigate a torque step difference due to a change-over between idling and other running conditions of the engine.

It is also preferable that the trimming map specifies a correction amount to correct an error in a process for calculating the minimum spark advance for best torque.

It is also preferable that the control circuit sets the proportion PI so as to stabilize idle running of the engine.

This is accomplished for example by setting the proportion PI based on a difference of real rotation speed during idle running of the engine and a target rotation speed.

It is also preferable that the control circuit sets the proportion PI to a value for decreasing a torque generated by the engine when there is a gear shift of an automatic transmission. This is accomplished for example by setting the proportion PI according to an engine rotation speed and an opening of an engine throttle valve.

It is also preferable that the control circuit sets the proportion PI so as to decrease a shock after a rapid acceleration of the engine. This is accomplished for example by setting the proportion PI according to a change amount of a throttle valve opening of the engine.

It is also preferable that the control circuit sets the proportion PI so as to decrease a transient surge backing directly after a rapid acceleration of the engine. This is accomplished for example by setting the proportion PI according to a change amount of engine rotation speed.

This invention also provides an ignition controller for an engine, comprising a spark plug, a mechanism for setting a basic ignition timing of the spark plug, a mechanism for calculating a target torque as a proportion PI relative to a torque generated by the engine at the basic ignition timing, a mechanism for calculating an ignition timing correction amount based on the proportion PI, a mechanism for calculating a corrected ignition timing by applying the ignition timing correction amount to the basic ignition timing, and a mechanism for firing the spark plug in synchronism with the corrected ignition timing.

The details as well as other features and advantages of this invention are set forth in the remainder of the specification and are shown in the accompanying drawings.

DESCRIPTION OF THE PREFERRED EMBODIMENTS

Commonly-assigned U.S. patent application Ser. No. 08/893,717 by the title of "CONTROLLER AND CONTROL METHOD FOR ENGINE IGNITION TIMING" filed on Jul. 12, 1997 based on the priority application Tokugan Hei 8-183637, the disclosure of which is herein incorporated by reference, discloses an engine ignition controller to which this invention is applied.

Figure 1:
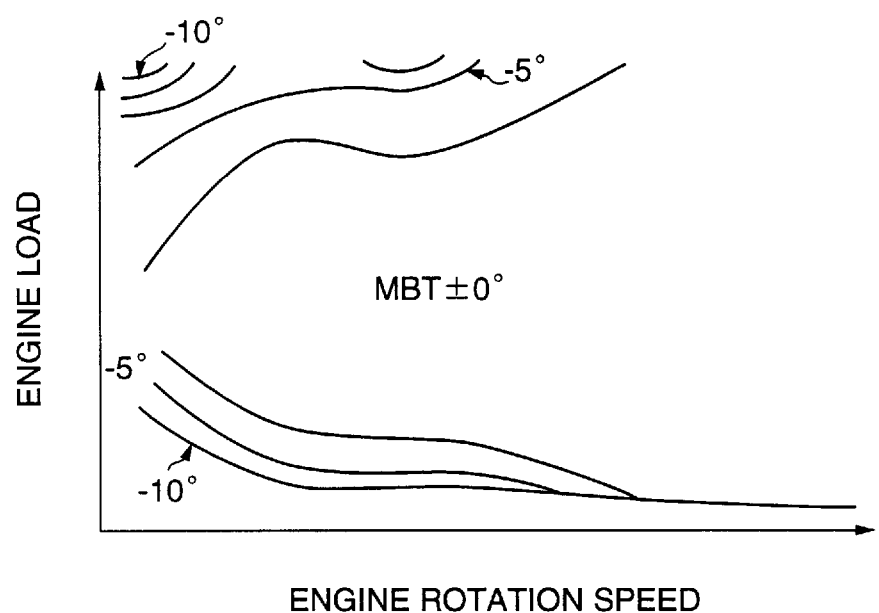
FIG. 1 is a diagram showing the characteristics of a basic ignition timing controlled by an igniting timing controller according to this invention.

This ignition timing controller retards a basic ignition timing relative to the MBT in the low speed, high load region of the engine as shown in FIG. 1, and also retards basic ignition timing relative to MBT when the engine is in the idle state.

Even when this retardation control is performed, various torque-down controls are required to stabilize idle running, eliminate speed change shocks or reduce the shock after a sudden acceleration or transient surge backing immediately thereafter.

Figure 2:
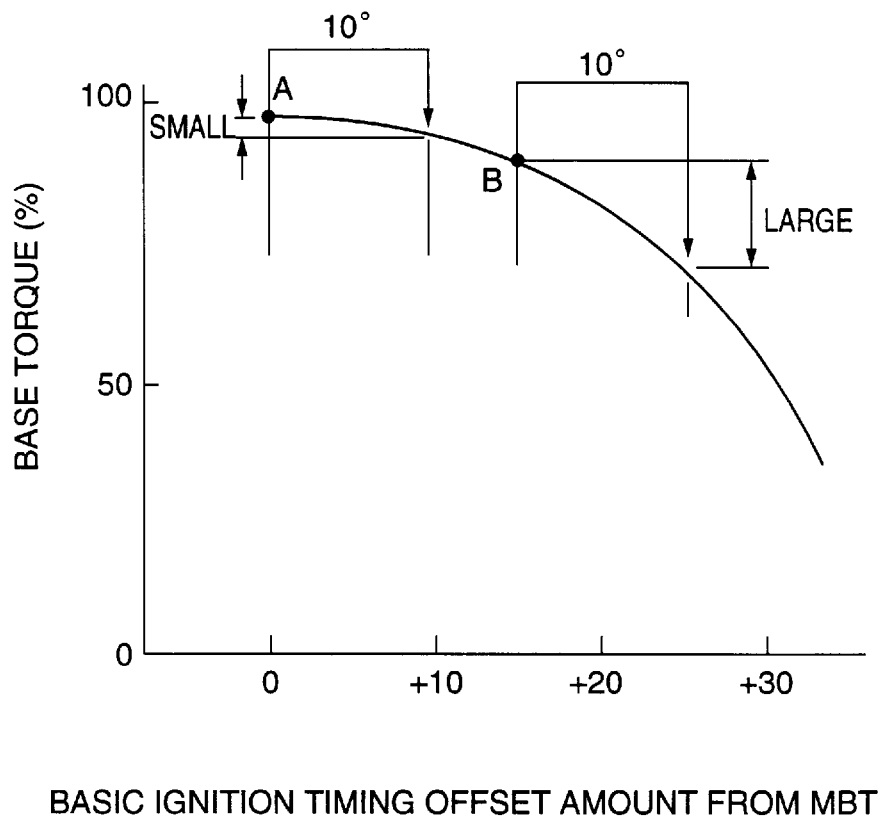
FIG. 2 is a graph showing a relation between an offset amount of basic ignition timing from an MBT and a base torque.

However, the relation between an offset amount from the MBT of the basic ignition timing and a base torque is not a first order linear relation as shown in FIG. 2, and it is therefore not easy to set an appropriate torque correction amount of the ignition timing. In this context, the base torque is an indicated torque which can be found from the engine indicator diagram.

Also, for the same torque-down request amount, the torque correction amount is different according to the offset amount from the MBT of the basic ignition timing. In other words, the decreasing torque relative to the correction amount of the ignition timing is different when the basic ignition timing is equal to the MBT as shown by the point A in FIG. 2, and when the basic ignition timing is later than the MBT as shown by the point B.

It is therefore not easy to adapt the correction amount of the ignition timing to the torque-down amount.

The ignition timing controller according to this invention thus introduces a decrease proportion relative to the torque generated for the basic ignition timing as a torque correction factor, and computes a torque correction amount of the ignition timing based on this torque correction factor.

The details of this control will now be described with reference to the flowcharts of FIGS. 3 and 4.

Figure 3:
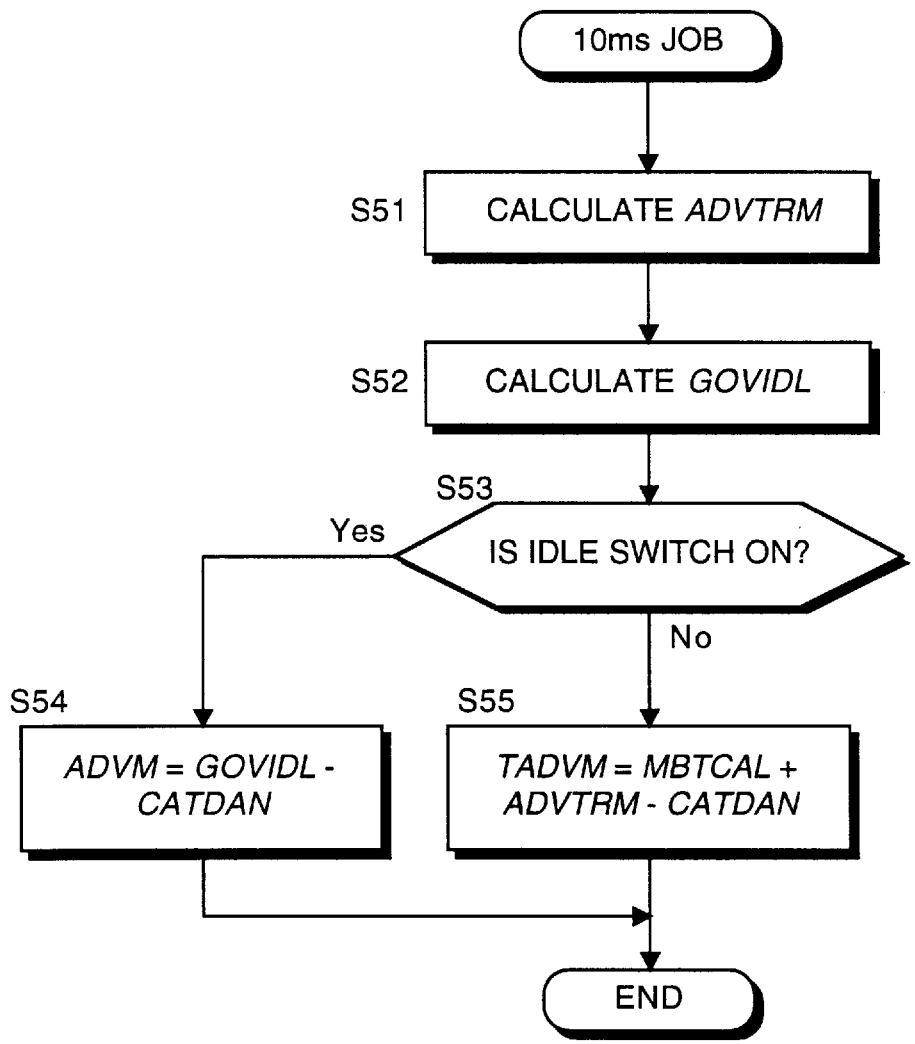
FIG. 3 is a flowchart describing a process for computing a basic ignition timing TADVM according to the ignition timing controller.

The flowchart of FIG. 3 shows the process of computing the basic ignition timing TADVM. This process is executed after the process of FIGS. 7A, 7B of the aforesaid U.S. Patent Application, which is herein incorporated by reference.

Steps S46 and S47 shown in FIG. 7B in the aforesaid U.S. patent application are, however, not part of the process executed by this ignition timing controller. In this ignition timing controller, the processing from steps S31 to S45 in FIGS. 7A, 7B of the aforesaid U.S. patent application is executed as a process for computing the minimum spark advance for best torque MBT.

Referring to FIG. 3, in a step S51, a trimming map correction value ADVTRM [deg] is computed.

The trimming map correction value ADVTRM is set in order to prevent knocking and surging, apply corrections to reduce noise and vibration, correct ignition timing in the idling region, and compensate a MBT computational error.

The trimming map correction value ADVTRM is looked up from a predetermined map from an engine rotation speed N and a charging efficiency ITAC as an engine load set in the step S31 of FIG. 7A of the aforesaid U.S. Patent Application.

When the trimming map correction value has a positive value, it expresses an advance, and when it has a negative value, it expresses a retardation.

The aforesaid corrections provided by the trimming map value ADVTRM are described in depth as follows.

(1) Anti-knocking correction

In general, in engine design, an engine compression ratio is set so large that knocking occurs when the throttle valve is fully open in order to improve fuel cost-performance or power as much as possible. Therefore, unless the ignition timing is not corrected at this position, knocking occurs and noise increases. The ignition timing is therefore retarded relative to the minimum spark advance for best torque MBT in the vicinity of the fully open position of the throttle valve by the trimming map correction value ADVTRM.

(2) Anti-surge correction

At MBT, for example in the deceleration region of the engine, partial combustion or misfire during flame propagation tends to occur, and this may give rise to surging. The ignition timing is therefore retarded relative to the minimum spark advance for best torque MBT by the trimming map correction value ADVTRM so as to enhance combustion stability in this region.

(3) Correction to reduce noise and vibration

When the pressure in the engine combustion chamber is P and the heat amount is Q, an exciting force is larger the higher the combustion pressure increase rate=DP/DQ, therefore engine noise increases and front/rear vibration of the engine also increases.

The ignition timing is therefore retarded compared to the MBT by the trimming map correction value ADVTRM so as to decrease DP/DQ.

(4) Correction in the idling region

During idling, to prevent hunting of the engine rotation and increase restoring force when load is applied to decrease speed losses, it is usual to retard ignition timing relative to the minimum spark advance for best torque.

MBT by a large amount. Hence when the idle switch is ON, an idle ignition timing GOVIDL is applied, and when the idle switch is OFF, the minimum spark advance for best torque MBT is used. The idle switch is attached to the throttle opening sensor, and it outputs an ON signal when the throttle is fully closed, otherwise it outputs an OFF signal. A torque step is produced due to change-over of the ignition timing when the idle switch is changed over. Therefore, in the idling region, i.e., in the vicinity of the idling state, the ignition timing is retarded relative to the minimum spark advance for best torque MBT by the trimming map correction value ADVTRM.

(5) Correction of the MBT computational error

The equation (12) described in the aforesaid U.S. patent application for the computation of an MBT computation value MBTCAL may have an error due to engine rotation speed, engine load, engine cooling water temperature, air-fuel ratio of the air-fuel mixture supplied to the engine, presence or absence of an exhaust gas recirculation (EGR) mechanism and EGR factor, presence or absence of a swirl control valve, and valve timing variations caused by a variable valve timing system. This error is corrected by the trimming map correction value ADVTRM.

In the ignition timing controller according to this invention, when warm-up of the catalyst in the catalytic converter is complete, if the idle switch is ON, the idle ignition timing GOVIDL is applied and the ignition timing is corrected so that it is retarded relative to the minimum spark advance for best torque MBT. If the idle switch is OFF, an MBT computation value MBTCAL is corrected by the trimming map correction value ADVTRM.

If the MBT computation value MBTCAL and trimming map correction value ADVTRM are not separated, the following problems occur corresponding to each of the aforesaid points (1)–(5).

(A) Regarding (1), knocking occurs when the throttle is in the fully open position. When the ignition timing is retarded in all running regions in order to avoid knocking, fuel-cost performance is impaired.

(B) Regarding (5), some parameters, e.g. differences of intake air temperature or valve timing, do affect the flame propagation speed but are not taken into account in the aforesaid MBT computation. If a trimming map correction is not applied, therefore, these parameters are not reflected in the ignition timing.

(C) Regarding (3) and (4), an ignition timing correction for decreasing noise or vibration, or an ignition timing correction in the idling region, cannot be made, if the trimming map correction is not applied.

(D) Regarding (5), as the error in the MBT computational equation cannot be corrected, fuel-cost performance is impaired.

However, according to this invention, the trimming map correction value ADVTRM is introduced separately from the MBT computation value, so the above problems (A)–(D) do not arise.

In a step S52, an idle ignition timing GOVIDL [deg] is computed. When the idle switch is ON, i.e. in order to improve engine running stability under no load conditions and decrease the hydrocarbon (HC) discharge amount, the idle ignition timing GOVIDL is set so that the ignition timing is largely retarded relative to the minimum spark advance for best torque MBT as was described in the case of FIG. 1.

The GOVIDL is computed as the sum of a value GOV found by looking up a predetermined table from the engine rotation speed N, and a value ADVCD1 found by looking up a predetermined table from the engine cooling water temperature Tw.

In a step S53, it is determined whether or not the idle switch is ON. When the idle switch is ON, a basic ignition timing TADVM [deg] is calculated by the following equation in a step S54.

$$TADVM = GOVIDL - CATDAN \qquad (13)$$

where, CATDAN=catalyst warm-up correction value [deg]

In equation (13), TADVM is a crank angle measured on the advance side of compression top dead center. The minus sign assigned to CATDAN therefore signifies a retardation amount.

On the other hand, when the idle switch is OFF, the routine proceeds to a step S55 from the step S53.

Herein, the basic ignition timing TADVM [deg] is calculated by the following equation (14) using the aforesaid MBT computation value MBTCAL:

$$TADVM = MBTCAL + ADVTRM - CATDAN \qquad (14)$$

The trimming map correction value ADVTRM is intended to prevent knocking and surging, apply corrections to reduce noise and vibration, apply corrections to eliminate torque steps in the idling region, and correct for an error in the MBT computation equation. ADVTRM is found by looking up a predetermined map from the engine rotation speed N and the filling efficiency ITAC obtained in the step S31 of FIG. 7A in the aforesaid U.S. Patent Application as an engine load.

Figure 4:
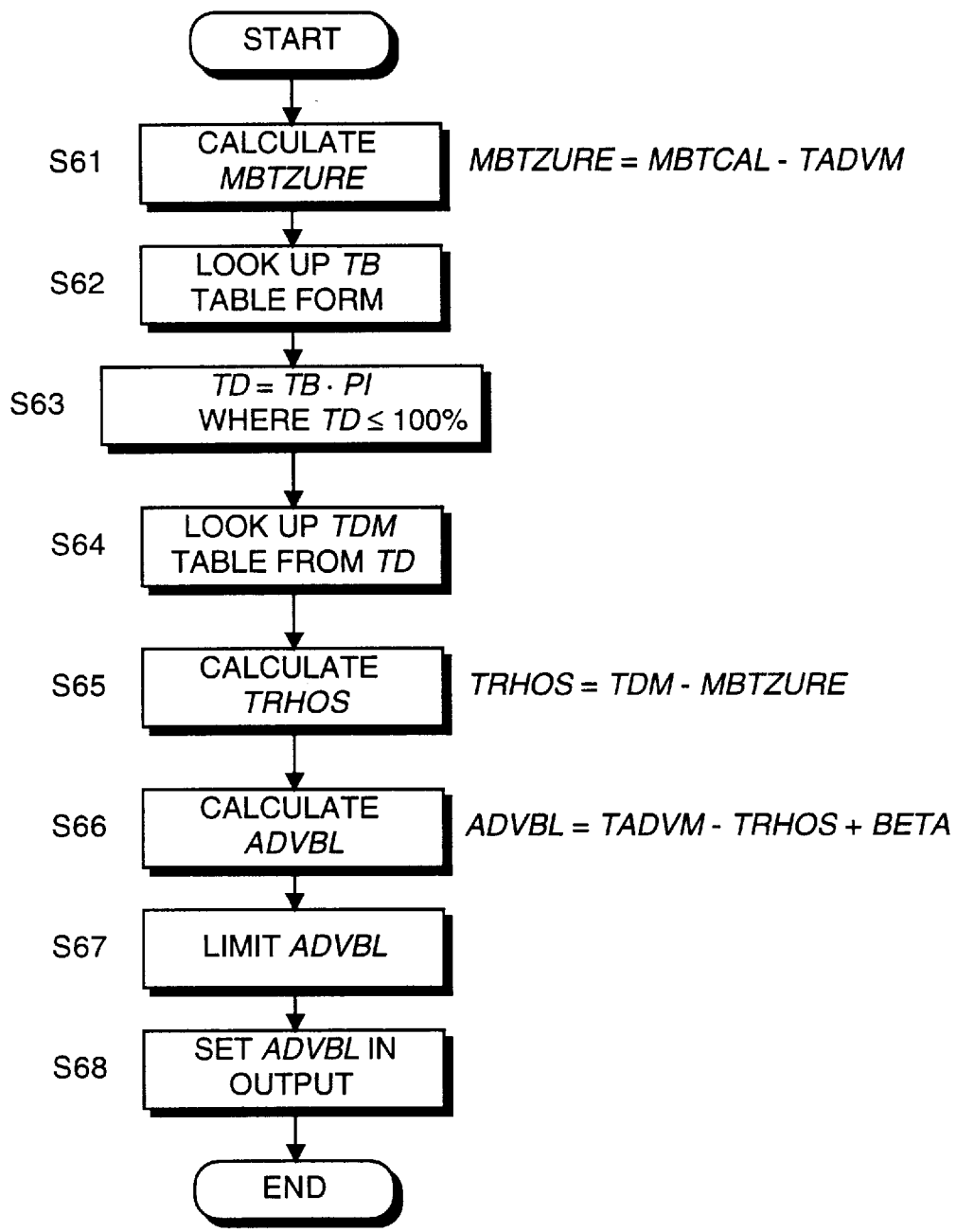
FIG. 4 is a flowchart describing a process for setting a corrected ignition timing ADVBL according to the ignition timing controller.

The flowchart of FIG. 4 is a process for setting a corrected ignition timing ADVBL. Unlike the process shown in FIG. 3 and the process for computing the minimum spark advance for best torque MBT from the steps S31 to S45 in FIGS. 7A, 7B of the aforesaid U.S. Patent Application, this process is executed in synchronism with a Ref signal.

In steps S61–S65, a retardation correction amount TRHOS for obtaining torque-down is computed. First, the procedure for computing the retardation correction amount TRHOS when the basic ignition timing TADVM is retarded relative to the minimum spark advance for best torque MBT, will be described with reference to the diagram of FIG. 5. The horizontal axis in the diagram shows an offset amount of the basic ignition timing TADVM from the minimum spark advance for best torque MBT. When MBTCAL−TADVM=0, i.e. when the basic ignition timing TADVM coincides with MBTCAL, the base torque is a maximum, and it decreases as the offset amount of TADVM from MBTCAL increases.

Herein, the unit of base torque is percentage, the maximum base torque being 100%. By not expressing torque in units of kg.m and using percentages instead, the same characteristics are effectively obtained even when the engine rotation speed and load are different. A single map may therefore be used regardless of engine rotation speed and load.

Using this diagram, a method will now be described of finding the retardation correction amount when MBTCAL−TADVM is a positive value, i.e., the basic ignition timing is retarded relative to MBTCAL.

Step I: The base torque corresponding to MBTCAL−TADVM is found on the diagram. Let the calculated value be TB[%].

Step II: If the torque-down factor is PI[%], TB·PI is the base torque TD[%] after torque-down.

Step III: An ignition timing TDM [deg] corresponding to TD is found on the diagram. This is the ignition timing offset amount TDM required to achieve the required torque-down.

Step IV: The difference between TDM and (MBTCAL−TADVM) is calculated. This is the retardation correction amount TRHOS [deg] to reduce the best torque from TB to TD.

The steps S61–S65 of FIG. 4 correspond to the aforesaid steps.

First, in the step S61, an MBT offset amount MBTZURE [deg] is calculated from the MBT computation value MBTCAL and basic ignition timing TADVM by the following equation (15). MBTCAL is a value obtained in the step S45 of the aforesaid U.S. Patent Application, and TADVM is a value obtained in the steps S54 or S55 of FIG. 3.

$$MBTZURE = MBTCAL - TADVM \tag{15}$$

As this equation is used only when the basic ignition timing TADVM is retarded relative to the minimum spark advance for best torque MBT, the MBT offset amount MBTZURE is limited by MBTZURE≧0.

The reason why only the case when TADVM is retarded relative to MBT is considered, is as follows. Torque-down may be achieved also when the basic ignition timing TADVM is advanced relative to MBT, however due to this advance, knocking occurs and the discharge amount of nitrogen oxides (NOx) increases. To avoid this undesirable effect, an advance correction relative to the minimum spark advance for best torque MBT of the ignition timing is not made.

Figure 5:
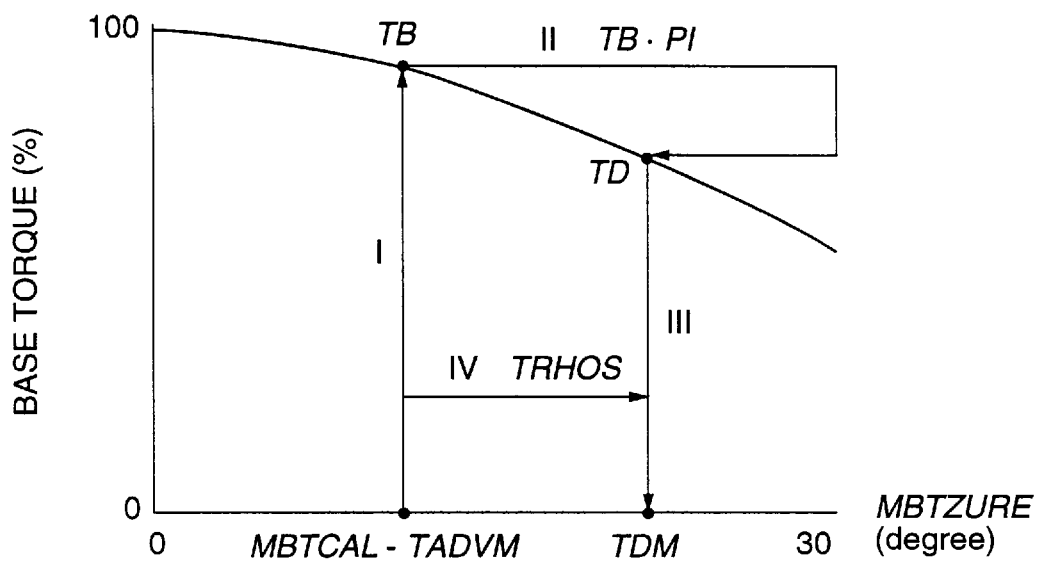
FIG. 5 is a diagram describing a process for computing a retardation angle correction amount TRHOS according to the ignition timing controller.

In a step S62, a TB table of the data shown in FIG. 5 is looked up from the MBT offset amount MBTZURE to find the base torque TB[%]. The base torque TB is an indicated torque found from the engine indicator diagram.

As shown in FIG. 5, the base torque is a maximum when MBTZURE is 0, and gradually decreases as MBTZURE increases.

In a step S63, the base torque after torque-down TD[%] is found from the following equation (16).

$$TD = TB \cdot PI \tag{16}$$

where, PI=torque-down factor [%]

Herein, the torque-down factor PI is a base torque proportion after torque-down of the base torque at the basic ignition timing, hence TD≦100%.

Figure 6:
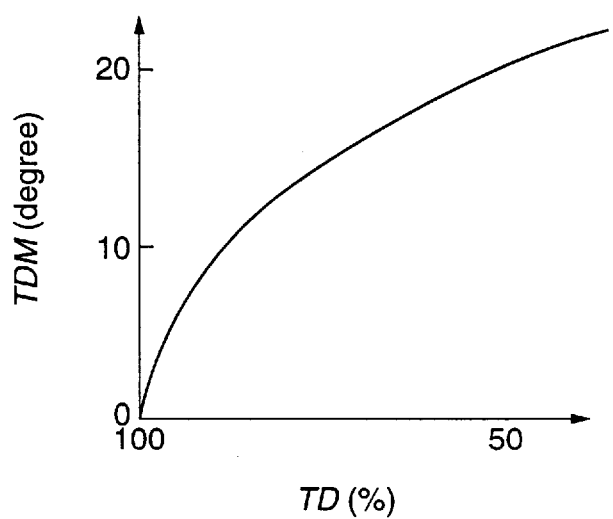
FIG. 6 is a graph showing the characteristics of a TDM table stored in the ignition timing controller.

In a step S64, a torque-down ignition timing TDM [deg] is found by looking up a TDM table having the characteristics shown in FIG. 6 based on TD. This expresses the offset amount of the ignition timing from MBT towards retardation as an angle. As shown in FIG. 5, when TD is 100%, TB is also 100%, and when TB is 100%, the ignition timing is equal to the minimum spark advance for best torque MBT and TDM is 0. TDM therefore increases as TD decreases from 100%.

In a step S65, the retardation correction amount TRHOS [deg] is calculated using this torque-down ignition timing TDM and MBT offset amount MBTZURE from the following equation (17).

$$TRHOS = TDM - MBTZURE \tag{17}$$

In a step S66, the corrected ignition timing ADVBL [deg] is calculated from the following equation (18).

$$ADVBL = TADVM - TRHOS + BETA \tag{18}$$

where, BETA=knocking correction amount which may be either a positive or negative value.

In a step S67, limits are imposed on the maximum retardation and advance values of the corrected ignition timing ADVBL. When ADVBL exceeds either maximum value, the limiting value is taken as ADVBL.

In a step S68, the corrected ignition timing ADVBL determined in this way is set in an ignition output register.

As in the case of fuel injection, ignition is also performed by interrupt processing triggered by the input of a Ref signal. When the Ref signal appears at, for example, 70° before top dead center (referred to hereafter as 70° BTDC), and the counter value of the unit angle signal coincides with 70°−ADV, a primary current in the ignition coil is shut off, and ignition takes place.

Next, the aforesaid torque-down factor PI will be described.

The torque-down factor PI is determined by the following objectives.

(a) It stabilizes idle running.

(b) It eliminates speed change shocks in a vehicle fitted with an automatic transmission.

(c) It decreases the shock during rapid acceleration and transient surge backing immediately thereafter.

Figure 7:
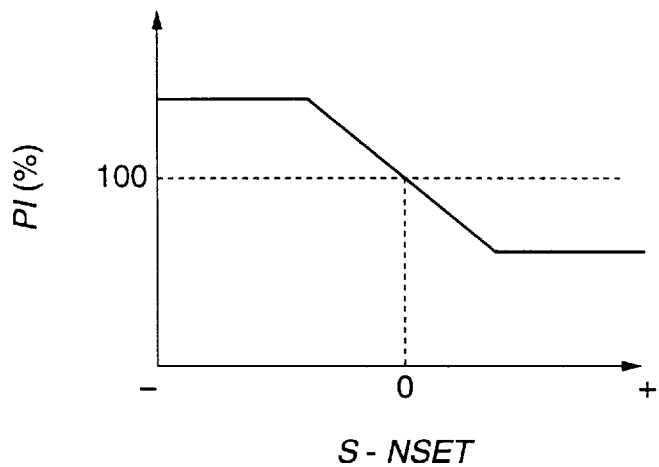
FIG. 7 is a graph showing the contents of a table of torque-down factors PI stored in the ignition timing controller.

In the case of (a), when the idle switch is ON, the torque-down factor PI is found by looking up a table having the characteristics shown in FIG. 7, based on a difference between the engine rotation speed N and target rotation speed NSET. As shown in this figure, when N>NSET, PI is a value less than 100%, and the real rotation speed N is decreased towards the target rotation speed NSET by decreasing the output torque of the engine according to the value of the torque-down factor PI.

On the other hand when N<NSET, the torque must be increased.

In this case, provided that the basic ignition timing was set to the minimum spark advance for best torque MBT when the engine is running idle, the ignition timing is advanced relative to MBT as PI>100%, so the engine output torque actually decreases in this case. However, in this ignition timing controller, when the idle switch is ON, the basic ignition timing TADVM is largely retarded relative to MBT by applying the idle ignition timing GOVIDL to the ignition timing in the step S54 in FIG. 3. Therefore even when PI exceeds 100%, there is little possibility that the ignition timing will be more advanced than the minimum spark advance for best torque MBT, and sufficient correction can be made within the range TD≦100% in the step S63 of FIG. 4.

Figure 9:
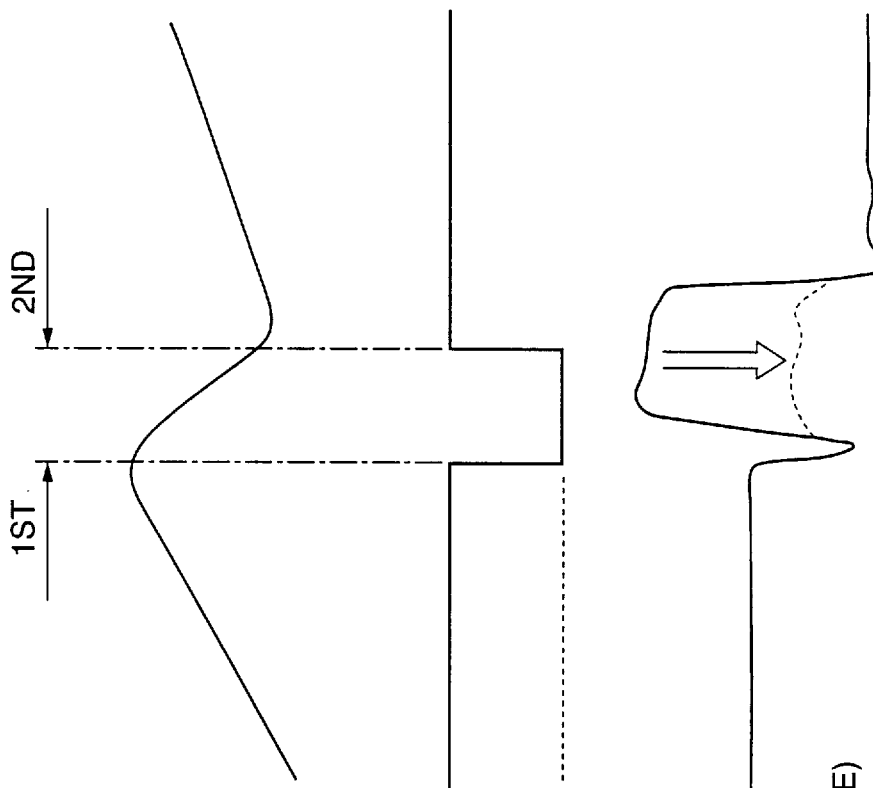
FIGS. 9A–9C are timing charts showing a variation of engine rotation speed, torque-down factor and transmission output torque when there is a shift-up according to the ignition timing controller.

(b) will now be described with reference to FIGS. 9A–9C.

Herein, the automatic transmission is performing a shift-up from first gear to second gear. During shift-up, when torque-down control is not performed, the output torque G of the transmission mechanism temporarily increases after shift-up, as shown in FIG. 9C, by the kinetic energy corresponding to a change ΔN of the engine rotation speed N at the time of shift-up. Therefore, the torque-down factor PI during shift-up is set to for example 70%, and the engine torque is decreased by the kinetic energy corresponding to ΔN. This decrease of engine torque and the temporary increase of transmission output torque due to shift-up cancel each other out. Hence the variation of transmission output torque at the time of shift-up decreases as shown by the broken line in FIG. 9C, and a speed change shock is prevented.

Figure 8:
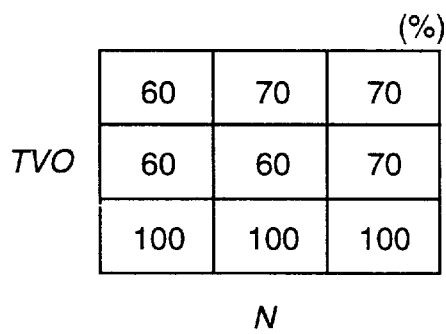
FIG. 8 is a map of torque-down factors PI stored in the ignition timing controller.

Specifically, a torque-down request signal is input from a transmission controller control unit to the ignition timing controller control unit, and the ignition timing controller control unit calculates the torque-down factor PI by looking up a map shown in FIG. 8 from real engine rotation speed N and a throttle valve opening TVO.

The above description refers to what happens when shift-up occurs, and the torque-down factor PI is set in the same way when torque-down control is performed during a shift-down.

(c) will be now described with reference to FIGS. 12A–12D.

Figure 12:
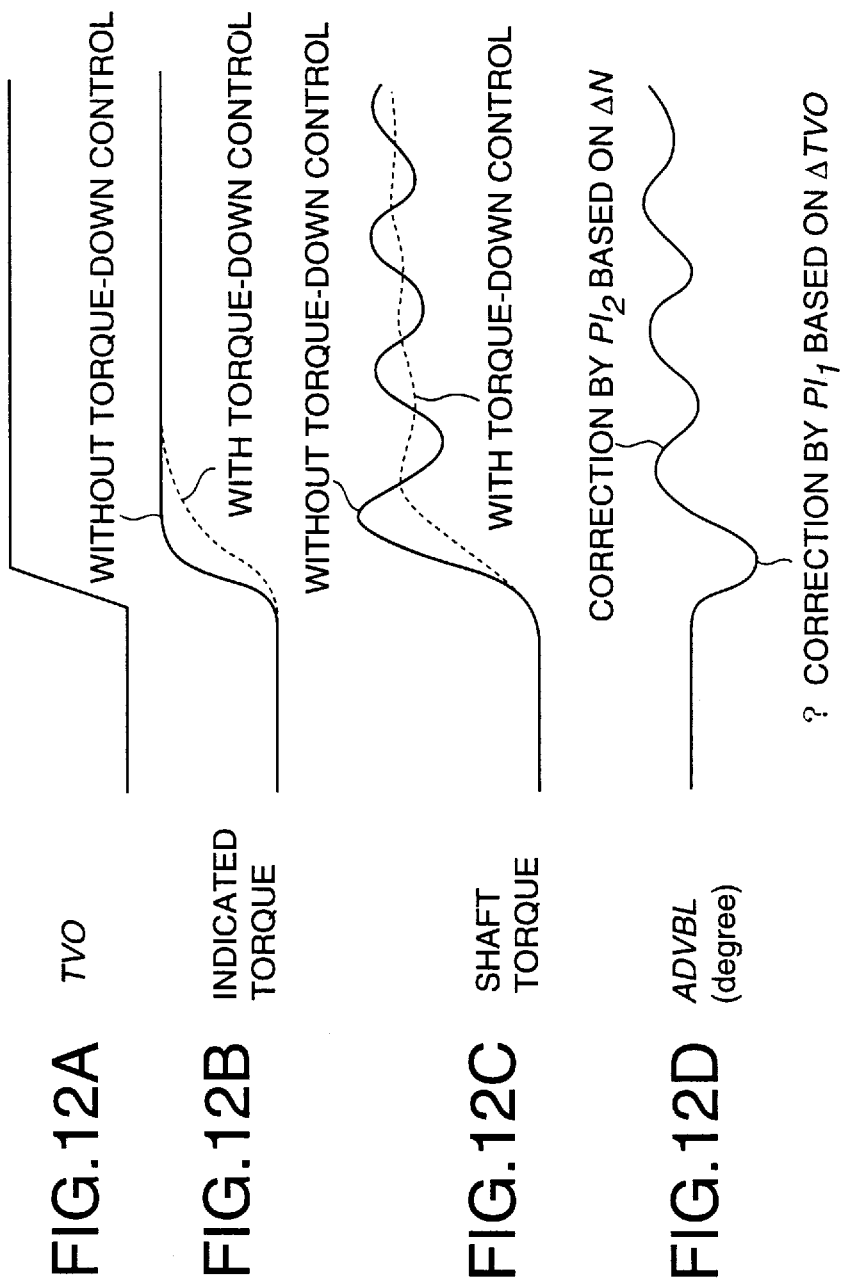
FIGS. 12A–12D are timing charts showing a variation of throttle opening, various torques and variation of ignition timing when there is a sudden engine acceleration under control by the ignition timing controller.

When the throttle valve opening TVO suddenly varies in the vicinity of the fully open position as shown in FIG. 12A due to a rapid acceleration, and torque-down control is not performed, the engine shaft torque oscillates after a rapid rise as shown by the solid line in FIG. 12C, and as a result, the vehicle suffers a shock and transient surge backing. The initial rise of the shaft torque is therefore smoothed by correcting the ignition timing by a torque-down factor $PI_1[\%]$ according to ΔTVO as shown in FIG. 12D. Further, the ignition timing is corrected by a torque-down factor $PI_2[\%]$ according to the rate of change ΔN of the real engine rotation speed. The shock occurring directly after a rapid acceleration is thereby mitigated, and transient surge backing is prevented.

Figure 10:
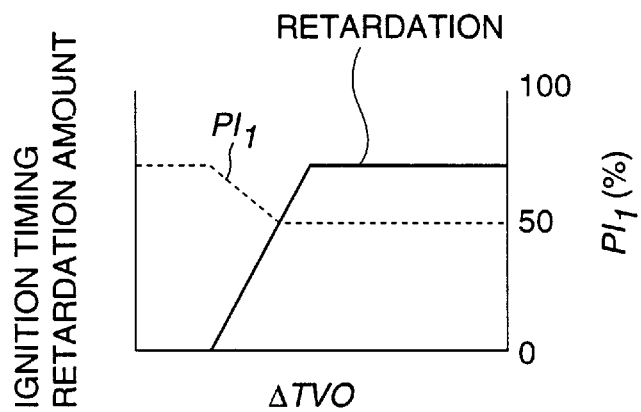
FIG. 10 is a diagram showing the characteristics of a $PI_1$ table stored in the ignition timing controller.
Figure 11:
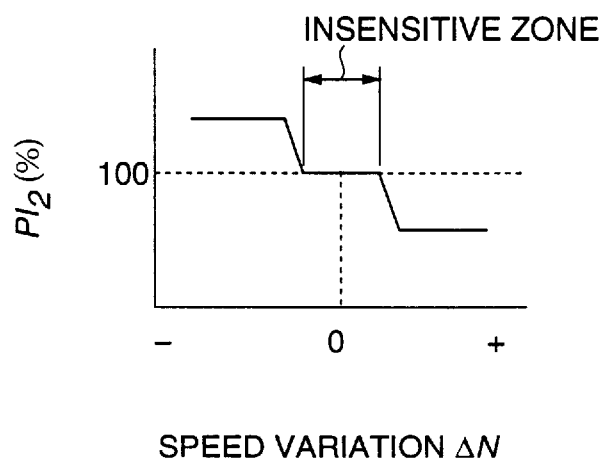
FIG. 11 is a diagram showing the characteristics of a $PI_2$ table stored in the ignition timing controller.

Specifically, $PI_1$ is found by looking up a table of the data shown in FIG. 10 based on the variation amount ΔTVO of the throttle valve opening, and $PI_2$ is found by looking up a table of the data shown in FIG. 11 based on the variation amount ΔN of the rotation speed N. The sum of $PI_1$ and $PI_2$ is set equal to PI.

When ΔN<0, a torque-up is required.

As described in (1), the basic ignition timing is retarded relative to the minimum spark advance for best torque MBT to prevent knocking in the vicinity of the fully open position of the throttle valve. There is therefore some tolerance in the ignition timing correction for torque-up.

However there is not as much correction tolerance as there is during idle running, so the value of $PI_2$ to prevent transient surge backing is not set so far towards advance.

According to the aforesaid ignition control, whether the basic ignition timing TADVM coincides with the MBT computation value MBTCAL or is offset relative to MBTCAL, the torque-down proportion which is actually generated relative to the torque-down factor PI is the same. In other words, as torque-down takes place according to the torque-down factor PI regardless of the ignition timing, if the TB table shown in FIG. 5 and the TDM table shown in FIG. 6 are suitably adjusted, the ignition timing can be corrected using the same TB table and TDM table by changing only the torque-down factor PI when there is a torque-down request. For example, when it is desired to reduce the torque from 90% to 80%, the torque-down factor PI may be reduced from 90% to 80%. As a result, fast, accurate responses can be made to changes of torque-down requests. Also as only a small number of tables is used, little effort is required in adapting them.

Next, a second embodiment of this invention will be described with reference to FIGS. 13 and 14.

Figure 13:
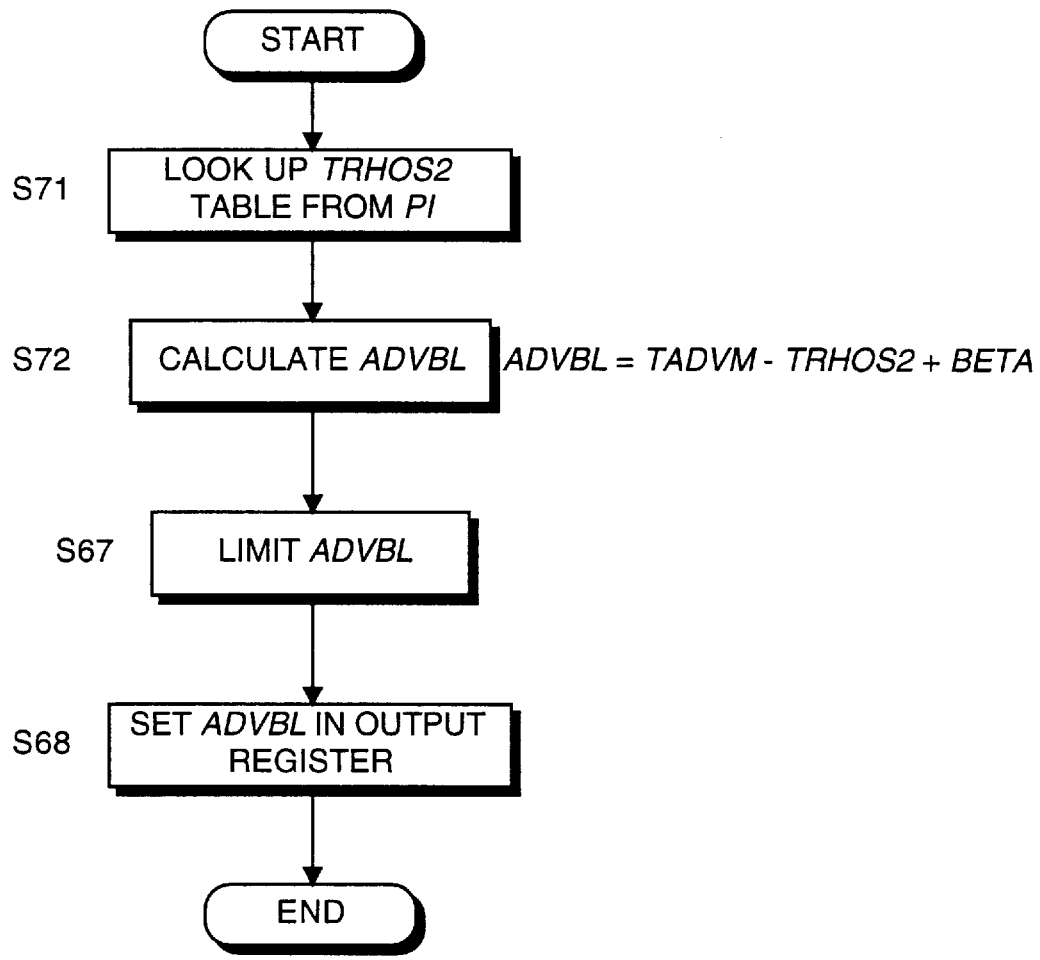
FIG. 13 is a flowchart describing a process for computing the corrected ignition timing ADVBL according to a second embodiment of this invention.
Figure 14:
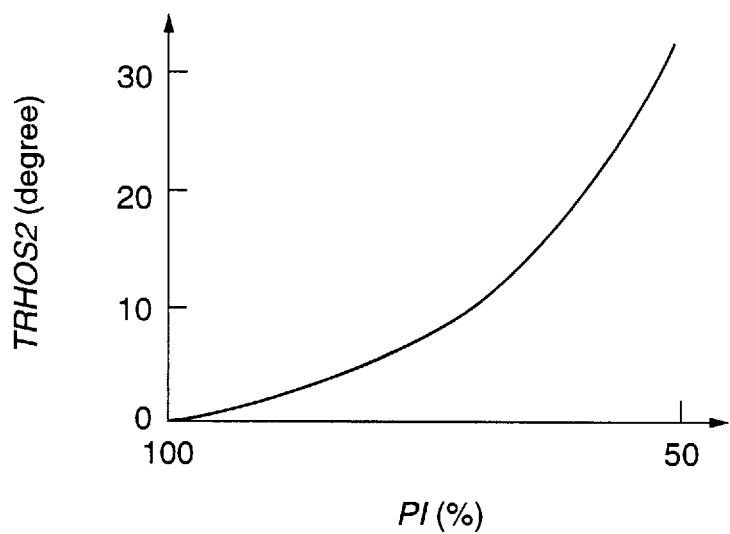
FIG. 14 is a diagram showing the characteristics of a retardation angle correction TRHOS2 according to the second embodiment.

The flowchart of FIG. 13 corresponds to the process of FIG. 4 of the aforesaid first embodiment. Steps S71 and S72 are provided instead of the steps S61–S66. Also in this ignition controller, the control unit is previously provided with a table which defines the relation between the torque-down factor PI[%] and a retardation correction amount TRHOS2[deg] as shown in FIG. 14.

In the step S71, the retardation correction amount TRHOS2[deg] is found by looking up this table from the torque-down factor PI[%].

In the step S72, the corrected ignition timing ADVBL is calculated from the following equation (19).

$$ADVBL=TADVM-TRHOS2+BETA \quad (19)$$

According also to this second embodiment, the retardation correction amount TRHOS2 is calculated according to the torque-down factor PI, hence by suitably setting the table of the retardation correction amount TRHOS2, a fast, accurate response can be made to changes of torque-down requests as in the case of the first embodiment.

The above embodiments were described in the case of an engine comprising a lean burn system and an EGR mechanism, however they may be applied also to an engine comprising only one of these or to an engine which does not comprise either of them.

The embodiments of this invention in which an exclusive property or privilege is claimed are defined as follows. The corresponding structures, materials, acts, and equivalents of all means or step plus function elements in the claims are intended to include any structure, material, or acts for performing the functions in combination with other claimed elements as specifically claimed.

We claim:

1. An ignition controller for an engine, comprising:
   a spark plug, and a control circuit functioning to:
- set a basic ignition timing of the spark plug;
- calculate a target torque as a proportion PI relative to a torque generated by the engine at the basic ignition timing;
- calculate an ignition timing correction amount based on said proportion PI;
- calculate a corrected ignition timing by applying said ignition timing correction amount to said basic ignition timing; and
- fire said spark plug in synchronism with said corrected ignition timing.

2. An ignition timing controller as defined in claim 1, wherein said control circuit calculates said ignition timing correction amount by the following process:
- calculating an offset amount MBTZURE of said basic ignition timing from a minimum spark advance for best torque;
- calculating a base torque based on said offset amount MBTZURE;
- calculating a corrected torque by multiplying said base torque by said proportion PI;
- calculating an offset amount TDM from said minimum spark advance for best torque corresponding to said corrected torque; and
- setting a difference between said offset amount MBTZURE and said offset amount TDM as said ignition timing correction amount.

3. An ignition timing controller as defined in claim 2, wherein said control circuit applies an indicated torque of the engine found from an engine indicator diagram as the base torque.

4. An ignition timing controller as defined in claim 3, wherein said control circuit calculates said base torque as a proportion relative to a maximum base torque.

5. An ignition timing controller as defined in claim 2, wherein said control circuit sets said basic ignition timing to be retarded relative to said minimum spark advance for best torque.

6. An ignition timing controller as defined in claim 2, wherein said control circuit is further functioning to calculate said minimum spark advance for best torque by the following process:
(a) dividing a total gas weight in a cylinder of said engine by a basic value of unburnt gas density in said cylinder and a basic value of stratified flow flame velocity in said cylinder;
(b) adding a predetermined firing retardation time of said spark plug to the value obtained in process (a); and
(c) converting the value obtained in process (b) to said minimum spark advance for best torque.

7. An ignition timing controller as defined in claim 6, wherein said control circuit sets said basic ignition timing by offset correcting said minimum spark advance for best torque based on a trimming map.

8. An ignition timing controller as defined in claim 7, wherein said trimming map specifies a retardation amount to prevent knocking of said engine.

9. An ignition timing controller as defined in claim 7, wherein said trimming map specifies a retardation amount to prevent surge of said engine.

10. An ignition timing controller as defined in claim 7, wherein said trimming map specifies a retardation amount to control a combustion pressure increase rate of said engine.

11. An ignition timing controller as defined in claim 7, wherein said trimmiing map specifies a retardation amount to mitigate a torque step difference due to a change-over between idling and other running conditions of said engine.

12. An ignition timing controller as defined in claim 7, wherein said trimming map specifies a correction amount to correct an error in a process for calculating said minimum spark advance for best torque.

13. An ignition timing controller as defined in claim 1, wherein said control circuit sets said proportion PI so as to stabilize idle running of said engine.

14. An ignition timing controller as defined in claim 13, wherein said control circuit calculates said proportion PI based on a difference of real rotation speed during idle running of said engine and a target rotation speed.

15. An ignition timing controller as defined in claim 1, wherein said control circuit sets said proportion PI to a value for decreasing a torque generated by the engine when there is a gear shift of an automatic transmission.

16. An ignition timing controller as defined in claim 15, wherein said control circuit sets said proportion PI according to an engine rotation speed and an opening of an engine throttle valve.

17. An ignition timing controller as defined in claim 1, wherein said control circuit sets said proportion PI so as to decrease a shock after a rapid acceleration of the engine.

18. An ignition timing controller as defined in claim 17, wherein said control circuit sets said proportion PI according to a change amount of a throttle valve opening of said engine.

19. An ignition timing controller as defined in claim 1, wherein said control circuit sets said proportion PI so as to decrease a transient surge backing directly after a rapid acceleration of the engine.

20. An ignition timing controller as defined in claim 19, wherein said control circuit sets said proportion PI according to a change amount of engine rotation speed.

21. An ignition controller for an engine, comprising:
- a spark plug,
- means for setting a basic ignition timing of the spark plug,
- means for calculating a target torque as a proportion PI relative to a torque generated by the engine at the basic ignition timing,
- means for calculating an ignition timing correction amount based on said proportion PI,
- means for calculating a corrected ignition timing by applying said ignition timing correction amount to said basic ignition timing, and
- means for firing said spark plug in synchronism with said corrected ignition timing.

* * * * *